United States Patent
Windisch et al.

(10) Patent No.: US 7,944,811 B2
(45) Date of Patent: *May 17, 2011

(54) MULTIPLE MULTICAST FORWARDER PREVENTION DURING NSF RECOVERY OF CONTROL FAILURES IN A ROUTER

(75) Inventors: Kurt J. Windisch, Florence, OR (US); Isidoros Kouvelas, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 12/240,515

(22) Filed: Sep. 29, 2008

(65) Prior Publication Data
US 2009/0028044 A1  Jan. 29, 2009

Related U.S. Application Data

(63) Continuation of application No. 10/897,611, filed on Jul. 23, 2004, now Pat. No. 7,447,225.

(51) Int. Cl.
*H04L 1/00* (2006.01)
(52) U.S. Cl. ...................................................... 370/217
(58) Field of Classification Search ........... 370/216–228
See application file for complete search history.

(56) References Cited

U.S. PATENT DOCUMENTS

| | | | |
|---|---|---|---|
| 5,519,704 A | 5/1996 | Farinacci et al. | |
| 6,553,028 B1 | 4/2003 | Tang et al. | |
| 6,704,278 B1 | 3/2004 | Albert et al. | |
| 6,735,169 B1 | 5/2004 | Albert et al. | |
| 6,735,201 B1 | 5/2004 | Mahajan et al. | |
| 6,917,983 B1 | 7/2005 | Li | |
| 2003/0208618 A1* | 11/2003 | Mor et al. | 709/238 |
| 2004/0165604 A1 | 8/2004 | Oh et al. | |
| 2004/0205215 A1 | 10/2004 | Kouvelas et al. | |
| 2004/0225725 A1* | 11/2004 | Enomoto et al. | 709/220 |
| 2005/0002390 A1* | 1/2005 | Kim et al. | 370/389 |
| 2005/0207423 A1 | 9/2005 | Herbst | |
| 2006/0018253 A1 | 1/2006 | Windisch et al. | |
| 2006/0018333 A1 | 1/2006 | Windisch et al. | |
| 2008/0084890 A1* | 4/2008 | Kompella | 370/400 |

OTHER PUBLICATIONS

Bhaskar, N. et al., "Bootstrap Router (BSR) Mechanism for PIM," draft-ietf-pim-sm-bsr-04.txt, Internet Engineering Task Force (IETF), http://www.ietf.org, Jul. 18, 2004 pp. 1-37.

(Continued)

*Primary Examiner* — Kwang B Yao
*Assistant Examiner* — Tung Q Tran
(74) *Attorney, Agent, or Firm* — Casari and McKenna, LLP

(57) ABSTRACT

In one embodiment, a multicast router initiates non-stop forwarding (NSF) recovery. In the NDF recovery, data traffic forwarding operations continue throughout a data plane of the multicast router in the presence of a failure in a control plane of the multicast router. When the multicast router receives incoming multicast packets on an interface during the NSF recovery, it compares the incoming multicast packets with entries of a multicast forwarding table of the data plane of the multicast router. In response to the comparison, the multicast router prevents multiple multicast forwarders from forwarding multicast packets for a route over a link coupled to the interface during the NSF recovery.

18 Claims, 5 Drawing Sheets

OTHER PUBLICATIONS

Fenner, B. et al., "Protocol Independent Multicast—Sparse Mode (PIM-SM) :Protocol Specification (Revised)," draft-ietf-pim-sm-v2-new-09.txt IETF, http://www.ieft.org, Feb. 16, 2004 pp. 1-147.

Cain, B. et al., "Internet Group Management Protocol, Version 3," Request For Comments (RFC) 3376, IETF, http://www.ieft.org, Oct. 2002, pp. 1-53.

Rekhter et al., "A Border Gateway Protocol 4 (BGP-4)," RFC 1771, IETF, http://www.ieft.org, Mar. 1995, pp. 1-57.

Bates, T. et al., "Multiprotocol Extensions for BGP-4," RFC 2858, IETF, http://www.ieft.org, Jun. 2000, pp. 1-11.

Reynolds, J. et al., "Assigned Numbers," RFC 1700, Ietf, http://www.ietf.org, Oct. 1994, pp. 1-230.

Kaplan, Hadriel, "NSR Non-Stop Routing Technology," Avici Systems, Part 3 in the Reliability Series, 2002.

Ward, David, Routing/Signaling Non-Stop Forwarding and Increased Network and Node Availability, Cisco Systems, Feb. 2002.

* cited by examiner

MULTIPLE MULTICAST FORWARDER PREVENTION DURING NSF RECOVERY OF CONTROL FAILURES IN A ROUTER

CROSS-REFERENCE TO RELATED APPLICATION

The present Application is a continuation of U.S. patent application Ser. No. 10/897,611, filed on Jul. 23, 2004, and titled Multiple Multicast Forwarder Prevention During NSF Recovery of Control Failures in a Router.

The present Application is also related to the following commonly assigned U.S. patent application Ser. No. 10/897, 959 titled, System and Method for Preserving Multicast Data Forwarding during Control Failures in a Router, which application is hereby incorporated by reference as though fully set forth herein.

FIELD OF THE INVENTION

This invention relates generally to computer networks, and more particularly, to the prevention of multiple multicast forwarders over a link during recovery in a non-stop forwarding intermediate node of a computer network.

BACKGROUND OF THE INVENTION

Data communication in a computer network involves the exchange of data between two or more entities interconnected by communication links, segments and subnetworks. These entities are typically software processes executing on hardware computer platforms, such as end nodes and intermediate nodes. Communication software executing on the end nodes correlate and manage data communication with other end nodes. The nodes typically communicate by exchanging discrete frames or packets of data according to predefined protocols, such as the Transmission Control Protocol/Internet Protocol (TCP/IP).

An intermediate node, such as a router, may interconnect the subnetworks to extend the effective "size" of the computer network. The router executes routing protocols used to direct the transmission of data traffic between the end nodes, such as hosts. Typically, the router directs network traffic based on destination address prefixes contained in the packets, i.e., the portions of destination addresses used by the routing protocol to render routing ("next hop") decisions. Examples of such destination addresses include Internet Protocol (IP) version 4 (IPv4) and version 6 (IPv6) addresses. A prefix implies a combination of an IP address and a mask that cooperate to describe an area or range of the network that a router can reach, whereas a route implies a combination of a set of path attributes and a prefix.

Unicast data transfer (i.e., unicast forwarding) involves forwarding a data packet from a single sending process of an end node ("source") to a single receiving process of an end node ("receiver") on the computer network. Often the destination of the data packet issued by a source may be more than one, but less than all of the receivers on the network. This type of multicast data transfer (i.e., multicast forwarding) is typically employed to segregate communication between groups of receivers on the network. IP multicasting, in particular, may be used to disseminate data to a large group of receivers on the network.

To affect IP multicasting, the source generally specifies a destination IP address that is a multicast group address for the message and, as such, can only represent receivers of packets. The IPv4 (or IPv6) address range is subdivided into different prefixes, one of which is designated for use by IP multicast. Receivers typically notify their communication software of their desire to receive messages destined for the multicast group address; this is called "joining a multicast group". These receiving members then "listen" on the multicast address and, when a multicast message is received at a receiver, it delivers a copy of the message to each process that belongs to the group.

IP multicasting relies on (i) a group management protocol to establish and maintain local multicast group membership, and (ii) multicast routing protocols to route packets efficiently. The Internet Group Membership Protocol (IGMP) manages packet communication between hosts and their local multicast router, letting them join or leave groups. That is, IGMP is used to send a group membership message from a host to its directly connected ("last-hop") router, indicating that the host wants to join a group (address) as a receiver. Note that IGMP is an IPv4 group membership protocol; the conventional Multicast Listener Discovery (MLD) protocol is substantially similar to, and performs the same functions as, IGMP, but for IPv6. When group membership is established, multicast packets (identified by a multicast group address in the destination address field of an IP header) are forwarded between routers using multicast routing protocols.

Multicast routing protocols construct distribution trees through the network and direct multicast forwarding. The multicast distribution trees define the path that multicast traffic will take through the network to group members. These paths are based on source or shared multicast distribution trees. A multicast distribution tree is shared when any source (host) originating data traffic destined to a group address of a multicast group uses the same distribution tree to forward data to the receivers. In contrast, a source distribution tree is a separate, shortest path tree (SPT) built for each source originating traffic to the multicast group.

A rendezvous point is a specific router that is designated as the root of a shared multicast distribution tree. An announcement protocol is used to select and announce rendezvous points to all routers in the network. However, an alternative to using an announcement protocol to automatically advertise rendezvous points to all routers in the network is to manually configure the identity of the rendezvous points on all of the routers. Examples of such an announcement protocol include the Auto-RP multicast protocol available from Cisco Systems Inc. and the Bootstrap Router (BSR) described in *Bootstrap Router (BSR) Mechanism for PIM Sparse Mode*, Internet Engineering Task Force Internet-Draft, draft-ietf-pim-sm-bsr-03.txt, by Fenner, et al. February 2003. Examples of multicast routing protocols that use a rendezvous point include Protocol Independent Multicast-Sparse Mode (PIM-SM) and Bidirectional PIM (BIDIR-PIM) protocols. Other multicast protocols that do not require a rendezvous point include PIM dense mode (PIM-DM) and PIM source specific multicast (PIM-SSM) protocols.

IP multicast may be deployed on a computer network using a specific rendezvous point to build a shared multicast distribution tree for a multicast group falling within a destination address prefix or to build a separate SPT for each source originating traffic to the multicast group. Broadly stated, a router joins a multicast group (distribution tree) towards the rendezvous point or source. The interface on the router leading towards the rendezvous point or source is an ingress interface. Depending upon the multicast routing protocol, there is usually only one ingress interface on the router receiving multicast packets for a particular route. One or more interfaces on the router leading towards the hosts (receivers) are egress interfaces. The receivers are leaves or nodes on the distribution tree. Packets are sent from a source to the root (rendezvous point or source itself) of the distribution tree, where they are forwarded towards the branches and out to the nodes that represent the receivers. On each node, packets are received on the ingress interface towards the root of the tree and packets are forwarded out egress interfaces towards the receivers or nodes.

Specifically, a receiver uses IGMP to communicate a request to join a multicast group address to a last-hop router. The router communicates that request to its neighboring routers (neighbors) on the link towards the rendezvous point (for a shared tree) or source (for a SPT) using a multicast routing protocol, such as PIM. Auto-RP or BSR is used to distribute group range-to-rendezvous point address mapping configuration to all PIM-enabled routers that participate in the network topology. Collectively the routers construct a multicast distribution tree rooted at a rendezvous point or source for that group address and having a branch (link) that "pulls" packets towards the last-hop router. Note that only a single multicast router (forwarder) should forward packets for a route over a specific link of the tree.

The infrastructure of a router typically comprises functional components organized as a control plane and a data plane. The control plane includes the functional components needed to manage the traffic forwarding features of the router. These components include routing protocols, configuration information and other similar functions that determine the destinations of data packets based on information other than that contained within the packets. The data plane, on the other hand, includes functional components needed to perform forwarding operations for the packets.

For a single processor router, the control and data planes are typically implemented on the single processor. However, for some high performance routers, these planes are implemented within separate devices of the intermediate node. For example, the control plane may be implemented in a supervisor processor, whereas the data plane may be implemented within a hardware-assist device, such as a co-processor or a forwarding processor. In other words, the data plane is typically implemented in hardware that is separate from the hardware that implements the control plane.

The control plane generally tends to be more complex than the data plane in terms of the quality and quantity of software operating on the supervisor processor. Therefore, failures are more likely to occur in the supervisor processor when executing such complicated code. In order to ensure high availability in a router, it is desirable to configure the router such that if a failure arises with the control plane that requires restarting of software executing on the supervisor processor, the data plane continues to operate correctly. Restarting of control plane software may be necessary because of a failure with a routing protocol component or a software upgrade to that component. A router that is configured to enable its data plane to continue packet forwarding operations during restart of the control plane software is referred to as a non-stop forwarding (NSF) capable router.

Situations where a NSF capable router architecture is useful include both anticipated and non-anticipated failures in the control plane of the router. For example, failures in the control plane can include unanticipated or unplanned events (e.g., software crashes or hardware errors) as well as planned or anticipated events (e.g., scheduled maintenance). As for the latter, assume it is desired to upgrade software running on the supervisor processor or even remove and replace that processor for service. Such an upgrade or removal/replacement may cause an interruption in one or more routing protocols, but the NSF nature of the router allows continued forwarding of data through the router.

NSF router architectures have been implemented in unicast forwarding applications to enhance router availability and avoid disruption of data connectivity. These previous implementations often require modification of unicast routing protocols to add support to NSF. For example, modifications to a known unicast routing protocol allow support for graceful restart of router protocol failures. When the router is restarted, the modified protocol allows the router to obtain information (via protocol message exchanges) with its neighbors and without the neighbors "viewing" the router as being completely down, thereby obviating any changes to the routing topology.

U.S. patent application Ser. No. 10/897,959, titled System and Method for Preserving Multicast Data Forwarding during Control Failures in a Router, describes a multicast NSF router architecture that preserves multicast data forwarding through the router during NSF recovery of control failures without modifying existing multicast protocols. Various multicast components of the router cooperate to provide the multicast NSF architecture, including PIM and a multicast routing information base (MRIB) executing in a control plane of the router, as well as a multicast forwarding information base (MFIB) executing in a data plane. The MFIB is derived from the MRIB and is embodied as one or more multicast forwarding tables whose contents describe how to forward data packets through the router.

NSF recovery in the multicast router involves efficient restarting of a failed multicast component, such as PIM, and rebuilding of state based on conventional PIM protocol messages until all necessary information has been recovered. During NSF recovery, the control plane is disconnected from the data plane, which essentially "freezes" the contents of the MFIB multicast forwarding table. That is, any changes that occur in the control plane are not communicated to the data plane and are not reflected in the current MFIB that is used for forwarding data traffic. Thus, changes to network conditions are not acted upon within the data plane for the duration of the recovery period. As a result, the MFIB "blindly" forwards data traffic through the router using the frozen contents of its forwarding table.

However certain network condition changes, such as changes in unicast forwarding, which arise during the time that the MFIB forwards data traffic using its frozen ("stale") forwarding information may cause neighbors of the router to change their multicast forwarding. Multicast protocols generally depend on the full recursive state of unicast protocols. Changes to network topology that affect unicast forwarding, such as reverse path forwarding (RPF) state, may cause the neighbors to change their multicast forwarding and begin sending multicast data traffic on a different path (link). For example, a neighbor may change its multicast forwarding so that data traffic received from the router over a particular link for a particular route is forwarded back over that link onto the same interface from which the router forwarded that traffic. This results in multiple multicast forwarders on the link, which could possibly result in the generation of duplicate packets and the formation of a multicast loop.

Multicast loops are generally much worse than unicast loops. In the case of unicast forwarding, a packet traverses a unicast loop until a router decrements a time-to-live (TTL) parameter of the packet to zero, at which time the packet is discarded. Yet in the case of multicast forwarding, each time the packet traverses a multicast loop and "hits" a router that has more than one egress interface, the packet is replicated, thereby resulting in an explosion of packets. It is thus desirable to avoid the generation of duplicate packets and the possible formation of multicast loops.

SUMMARY OF THE INVENTION

The present invention is directed to a technique for preventing multiple multicast forwarders from forwarding multicast packets for a route over a link in a computer network during non-stop forwarding (NSF) recovery of one or more failures in a control plane of a multicast router. The multicast router has a functional infrastructure that allows data traffic forwarding operations to continue throughout a data plane of the router in the presence of a failure and/or software restart to a multicast component, e.g., a protocol independent multicast (PIM) routing protocol, executing in the control plane. Another multicast component, e.g., a multicast forwarding information base (MFIB) executing in the data plane, is configured to prevent multiple multicast forwarders due to routing changes in the network that arise during NSF recovery.

In the illustrative embodiment, the MFIB is embodied as one or more multicast forwarding tables that are populated with contents describing how to forward data packets through the router. Broadly stated, PIM populates an entry of the MFIB forwarding table with routing information (i.e., a route) that specifies an ingress interface on which an incoming multicast packet should be accepted, as well as a list of egress interfaces over which the incoming packet should be forwarded. In response to receiving the incoming packet from a neighbor, the MFIB performs a lookup operation into its forwarding table to find a route of an entry that matches a multicast destination address of the packet. The matching route instructs the router as to which egress interfaces the packet should be forwarded.

As described herein, the condition that triggers multiple multicast forwarder prevention is the packet arriving at the router on an egress interface of the matching route. The arrival of the multicast packet on that egress interface is a data-driven event that indicates a forwarding conflict between the matching route in the MFIB and a neighbor that also forwards packets to that interface, which may result in duplicate packets and/or multicast loops. Typically the data plane notifies the control plane of the data-driven event (via a control signal) and the control plane interprets that event in order to reconverge on the correct forwarding state. However, the control plane is disconnected from the data plane during NSF recovery and the contents of the MFIB multicast forwarding table are frozen. This forces the MFIB to forward data traffic through the router using the frozen contents of its forwarding table during NSF recovery.

According to the inventive technique, upon discovering that the incoming multicast packet is received on an egress (i.e., forwarding) interface of the router for its matching route, the MFIB halts forwarding of multicast packets over that interface for the route. Multicast packet forwarding over the egress interface may be illustratively halted by removing that interface from the route entry of the MFIB forwarding table. Specifically, the MFIB is configured to assume that the router would lose a PIM assert protocol negotiation procedure with its neighbor if the procedure were to take place. As a result, the MFIB removes the egress interface from its list of forwarding interfaces, thereby halting the forwarding of multicast packets over that interface. In essence, since the control plane has failed and is unable to immediately negotiate a correct forwarding with the neighbor, the MFIB unilaterally halts forwarding of the packet over the egress interface for that route to avoid the possible generation of duplicate packets and/or formation of a multicast loop. After NSF and control plane recovery, the MFIB forwarding table is updated with complete forwarding (route) information. MFIB may then resume forwarding over that interface, which triggers the PIM assert protocol negotiation procedure for the route that resolves the forwarding conflict between the routers.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
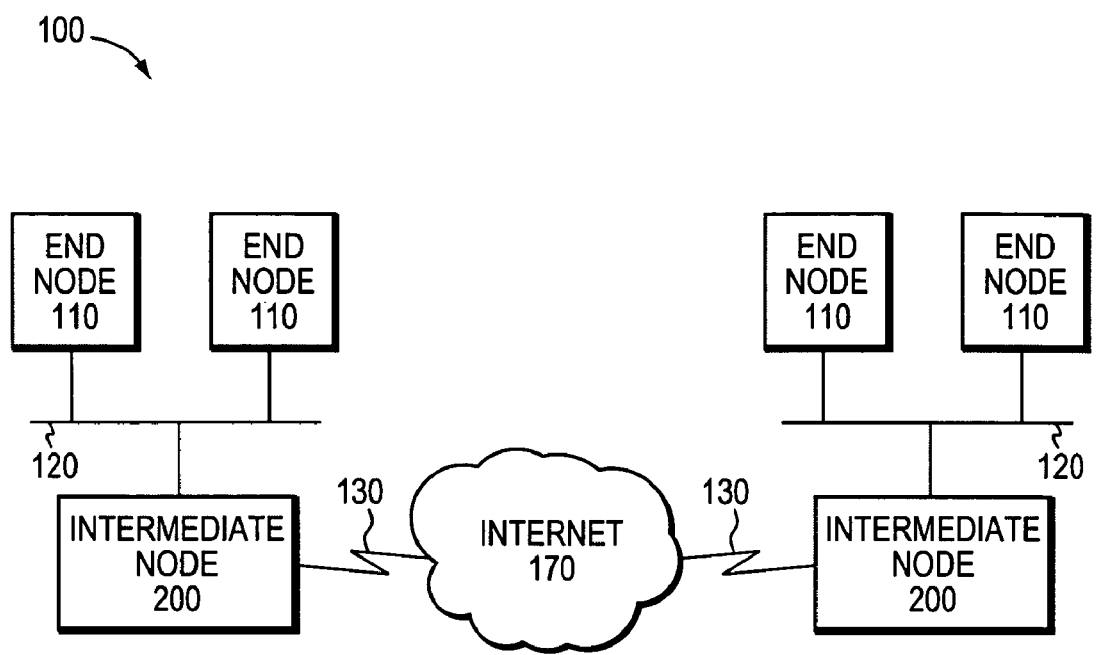
FIG. 1 is a schematic block diagram of a computer network that can be advantageously used with the present invention.

FIG. 1 is a schematic block diagram of a computer network 100 that can be advantageously used with the present invention. The computer network 100 comprises a collection of communication links, segments and subnetworks connected to a plurality of nodes, such as end nodes 110 and intermediate network nodes 200. The links, segments and subnetworks may comprise local area networks (LANs) 120, wide area networks (WANs) such as Internet 170 and WAN links 130 interconnected by intermediate nodes 200, such as network switches or routers, to form a network of computer nodes. The nodes communicate by exchanging data packets according to a predefined set of protocols, such as the Transmission Control Protocol/Internet Protocol (TCP/IP).

Figure 2:
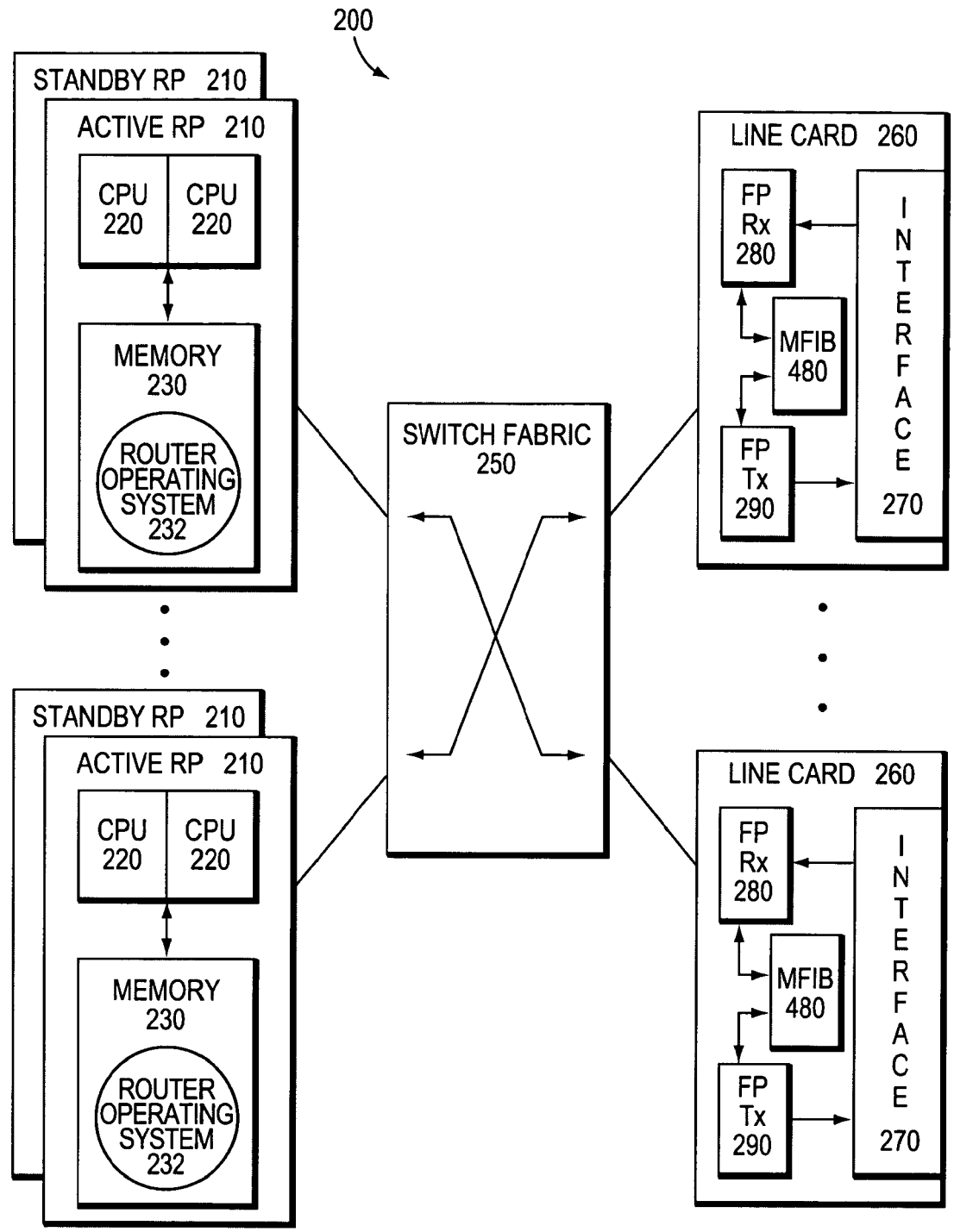
FIG. 2 is a schematic block diagram of an embodiment of a router that may be advantageously used with the present invention.

FIG. 2 is a schematic block diagram of a router, such as multicast router 200, which may be advantageously used with the present invention. The router 200 comprises a plurality of loosely coupled processors 210 connected to a plurality of ingress and egress line cards (line cards 260) via an interconnect 250 such as, e.g., a crossbar interconnection or high-speed bus. Those skilled in the art will recognize that other router platforms such as, e.g., a uniprocessor system or a plurality of independent nodes interconnected via a communications fabric as a multi-node cluster, could be used in accordance with the invention. In this context, the term "node" denotes a computer or processor complex comprising processors and an independent memory shared by the processors.

The processors 210 are illustratively route processors (RP) configured as active and standby RP pairs, with each processor having a dedicated memory 230. The memory 230 may comprise storage locations addressable by the processor for storing software programs and data structures associated with the invention. The processor 210 may comprise processing elements or logic for executing the software programs and manipulating the data structures. A router operating system 232, portions of which are typically resident in memory 230 and executed by the processor, functionally organizes the router by, inter alia, invoking network operations in support of software processes (described herein) executing on the processor. It will be apparent to those skilled in the art that other processor and memory means, including various computer readable media, may be used for storing and executing program instructions pertaining to the inventive technique described herein.

In the illustrative embodiment, the line cards perform forwarding of the data traffic, while the route processors handle routing and control of the data traffic forwarding. Each route processor comprises two central processing units (CPUs 220), e.g., Power-PC 7460 chips, configured as a symmetric multiprocessing (SMP) pair. The CPU SMP pair is adapted to run a single copy of the router operating system 232 and access its memory space 230. Each line card 260 comprises an interface 270 having a plurality of ports coupled to a receive forwarding processor (FP Rx 280) and a transmit forwarding processor (FP Tx 290). The FP Rx 280 renders a forwarding decision for each packet received at the router on an ingress interface of an ingress line card in order to determine where to forward the packet. To that end, the FP Rx makes use of a multicast forwarding information base (MFIB) 480, described further herein. In the event that the packet is to be forwarded to one of the router's route processors, the FP Rx makes use of an internal FIB, IFIB, to determine to which route processor the packet should be forwarded. Likewise, the FP Tx 290 performs lookup operations (using MFIB 480) on a packet transmitted from the router via one or more egress interfaces of an egress line card.

Figure 3:
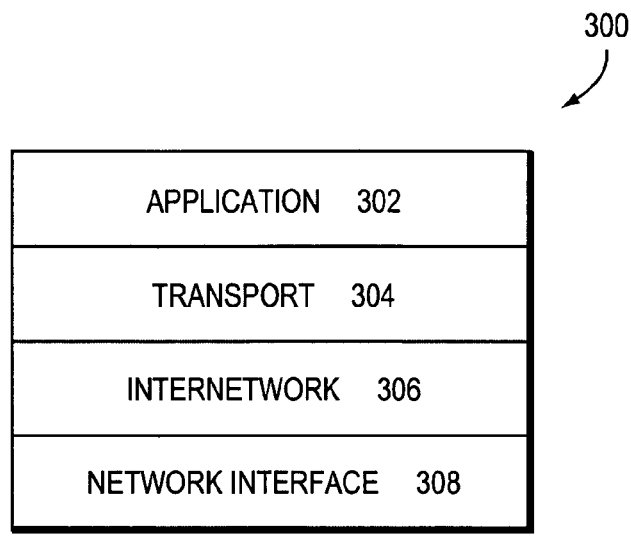
FIG. 3 is a schematic block diagram of a conventional protocol stack, such as the Internet communications protocol stack, within the router of FIG. 2.

A key function of the router 200 is determining one or more interfaces to which a packet is forwarded in the router; in order to accomplish such "routing" the routers cooperate to determine best paths through the computer network 100. The routing function is preferably performed by an internetwork layer of a conventional protocol stack within each router. FIG. 3 is a schematic block diagram of a conventional network protocol stack, such as the Internet communications protocol stack 300. The architecture of the Internet protocol stack is represented by four layers termed, in ascending interfacing order, the network interface layer 308, the internetwork layer 306, the transport layer 304 and the application layer 302.

The lower network interface layer 308 is generally standardized and implemented in hardware and firmware, whereas the higher layers are typically implemented in the form of software. The primary internetwork layer protocol of the Internet architecture is the IP protocol (IP). IP is primarily a connectionless protocol that provides for internetwork routing, fragmentation and assembly of exchanged packets—generally referred to as "datagrams" in an Internet environment—and which relies on transport protocols for end-to-end reliability and other service characteristics. An example of such a transport protocol is the TCP protocol, which is implemented by the transport layer 304 and provides connection-oriented, end-to-end reliability services to the upper layer protocols of the Internet architecture. The term TCP/IP is commonly used to denote the Internet architecture.

In particular, the internetwork layer 306 is concerned with how packets are forwarded through the network, although it is not directly concerned with how the MFIBs are calculated. A multicast routing protocol may be used to perform multicast routing (for the internetwork layer) through the computer network. Examples of multicast protocols that may be advantageously used with the present invention include the Protocol Independent Multicast-Sparse Mode (PIM-SM) and PIM source specific multicast (PIM-SSM) routing protocols, along with the Internet Group Membership Protocol (IGMP). These protocols are well know and described in detail in *Protocol Independent Multicast—Sparse Mode (PIM-SM): Protocol Specification (Revised)*, Internet Engineering Task Force Internet-Draft, draft-ietf-pim-sm-v2-new-09.txt, by Fenner et al. February 2004 and *Internet Group Management Protocol, Version* 3, *Request for Comments (RFC)* 3376, by Cain et al., October 2002, which are hereby incorporated by reference as though fully set forth herein.

PIM relies on an underlying topology-gathering protocol to populate a unicast routing table 425 (FIG. 4) of a routing information base (RIB 420) with routes. As used herein, a route comprises, inter alia, a combination of a set of path attributes and a prefix. The RIB stores generalized route state for those unicast routes that are needed by unicast forwarding and PIM 430. For unicast routes of interest, PIM caches information in its PIM topology table 435. The cached information includes next-hop addresses, next-hop interfaces, connected flags (indicating whether the addresses are directly connected) and metrics.

The routes in the RIB table may be provided directly from a unicast routing table or by separate routing protocols, such as the Border Gateway Protocol version 4 (BGP4) and Multi-protocol extensions to BGP4 (MBGP). BGP4 is an interdomain routing protocol used to perform interdomain routing (for the internetwork layer) through the computer network. The routers 200 (hereinafter "neighbors") exchange routing and network layer reachability information (NLRI) among autonomous systems over a reliable transport layer connection, such as TCP. An adjacency is a relationship formed between selected neighbors for the purpose of exchanging routing messages and abstracting the network topology. The BGP4 routing protocol standard is well known and described in *Request For Comments (RFC)* 1771, by Y. Rekhter and T. Li (1995), which is hereby incorporated by reference.

BGP4 is generally capable of only carrying routing information for IPv4; accordingly, MBGP extends BGP4 to allow carrying of routing information for multiple network layer protocols, including IPv6 addresses. MBGP extends BGP4 to associate these network layer protocols with next hop information and NLRI, including NLRI for multicast forwarding. Address Family Identifiers (AFIs) and Subsequent Address Family Identifiers (SAFIs) are used to identify the network layer protocols and the type of NLRI. MBGP and AFI/SAFI Address Family are well known and described in *RFC* 2858, by T. Bates et al. (2000) and *RFC* 1700 by J. Reynolds et al (1994), which are hereby incorporated by reference.

Figure 4:
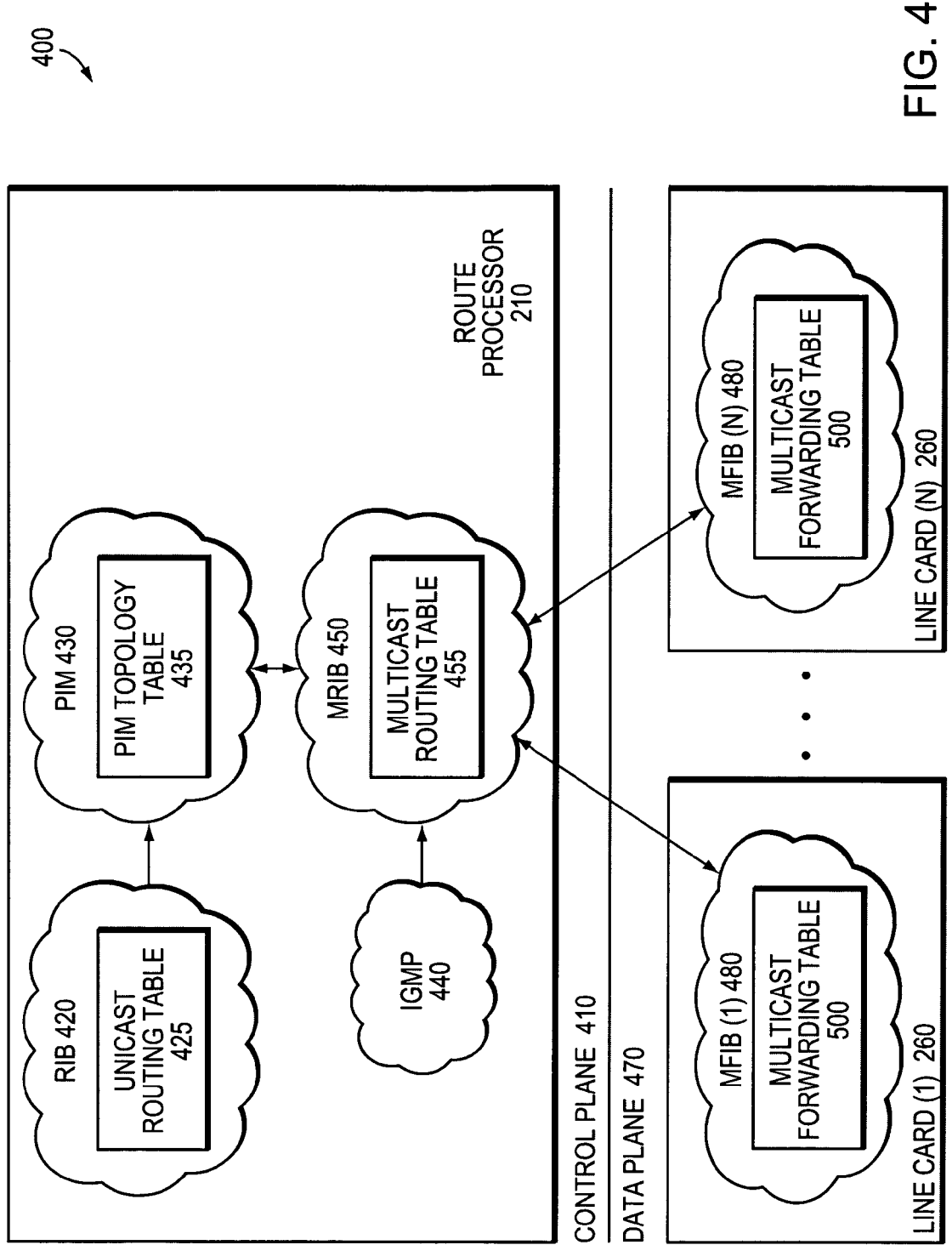
FIG. 4 is a schematic block diagram illustrating a functional non-stop forwarding (NSF) multicast infrastructure of the router of FIG. 2.

FIG. 4 is a schematic block diagram illustrating the functional infrastructure 400 of the router 200. The functional infrastructure 400 is preferably separated into a control plane 410 and a data plane 470, wherein separation is specified in terms of software components overlayed onto hardware elements, such as the route processors 210 and line cards 260. The data plane components/elements are configured to retrieve data packets from the network and provide those packets to forwarding logic of the router (and vice versa). In contrast, the control plane components/elements are used to manage/control traffic forwarding operations of the router. The infrastructure 400 allows the router to continue performing traffic forwarding operations throughout the data plane 470 in the presence of a failure and/or software restart within the control plane 410. In essence, the infrastructure enables the router 200 to function as a non-stop forwarding (NSF) capable router.

In the illustrative embodiment, the router operating system 232 implements multicast components as separate software process modules that are individually restartable and distributed over active route processors 210 and line cards 260 which, in turn, are individually hot-swapable and may have redundant (standby) backups. To that end, the data plane multicast components include MFIBs 1-N 480 executing on the line cards, whereas the control plane multicast components include the RIB 420, PIM 430, IGMP 440 and a multicast RIB (MRIB 450) executing on the route processors 210. Operationally, the control plane of the router builds the MRIB 450 (and, more specifically, its multicast routing table 455) after exchanging routing information with the neighbors. For example, PIM provides MRIB with a chosen reverse path forwarding (RPF) address and interface for each route, which is used by the data plane to accept packets for forwarding through the router. The primary role of the MRIB 450 is to facilitate communication between the various multicast components, i.e., coordinate distribution of state between the protocol applications (e.g., PIM, IGMP, etc.) and between these protocols and MFIB. As a result, MRIB provides the next hop router information and a multicast-capable path to each multicast destination. The MFIB 480 is derived from the MRIB and is embodied as one or more multicast forwarding tables 500 that are populated on the line cards 260 and whose contents describe how to forward data packets through the router.

Further to the illustrative embodiment, a multicast NSF router architecture is provided that enhances high availability of the router 200. The NSF router architecture leverages the functional infrastructure 400 of the router to prevent hardware or software failures in the control plane 410 from significantly disrupting the function of the data plane 470, thereby preserving multicast data forwarding during control failures. To that end, the architecture enables hardware or software components to fail while other hardware or software components enter NSF mode to continue performing their functions with minimal impact. For example, if a route processor 210 is removed from the router 200, thus taking down the entire control plane 410, the connection between MFIB 480 and MRIB 450 is broken and MFIB 480 enters NSF mode. If a single component (e.g., PIM 430) fails but the rest of the control plane, including MRIB 450, remains operational, then the connection between MRIB 450 and PIM 430 is broken and MRIB 450 will send a message to MFIB 480 instructing it to enter NSF mode.

Various multicast components of the router cooperate to enable efficient restart and recovery of the control plane failures without loss of data connectivity. Recovery in the multicast NSF router involves efficient restarting of a failed multicast component, such as PIM, and rebuilding of state based on conventional PIM protocol messages until all necessary information has been recovered. In this context, rebuilding of state denotes reestablishing communication between the recovering PIM routing protocol and its peer routing protocols executing in neighbors, and exchanging multicast control messages among those protocols to enable reconstruction of the PIM topology table. The PIM topology table 435 is illustratively located in a portion of memory 230 belonging to PIM and, as such, is not persistent across failures to the routing protocol. Thus when PIM restarts after a failure, its topology table is empty. As a result, a multicast NSF checkpointing and recovery technique monitors and persistently stores, i.e., checkpoints, selective information so that the information can be efficiently retrieved and used to rebuild the contents or state of the PIM topology table during NSF recovery. The checkpointing and recovery technique is described in the aforementioned U.S. patent application Ser. No. 10/897,959 titled, System and Method for Preserving Multicast Data Forwarding during Control Failures in a Router.

During NSF recovery, the control plane 410 is disconnected from the data plane 470 (e.g., there is no communication between PIM and MFIB), which essentially "freezes" the contents of the MFIB multicast forwarding table 500. That is, any changes that occur in the control plane (e.g., to the PIM topology table 435 and/or to the MRIB routing table 455) are not communicated to the data plane and, thus, are not reflected in the current MFIB that is used for forwarding data traffic. For example, updates to the control plane that occur in response to changes to network conditions, including events from multicast forwarding and/or changes in the unicast forwarding, are not acted upon within the data plane for the duration of the NSF recovery period. As a result, MFIB 480 "blindly" forwards data traffic through the router using the frozen contents of its forwarding table 500.

However certain network condition changes, such as changes in unicast forwarding, which arise during the time that the MFIB forwards data traffic using its frozen ("stale") forwarding information may cause neighbors of the router to change their multicast forwarding. Changes to network topology that affect unicast forwarding, such as RPF state, may cause the neighbors to change their multicast forwarding and begin sending multicast data traffic on a different path (link). For example, a neighbor may change its multicast forwarding so that data traffic received from the router over a particular link for a particular route is forwarded back over that link onto the same interface from which the router forwarded that traffic. This results in multiple multicast forwarders on the link, which could possibly result in the generation of duplicate packets and/or the formation of a multicast loop.

Figure 5:
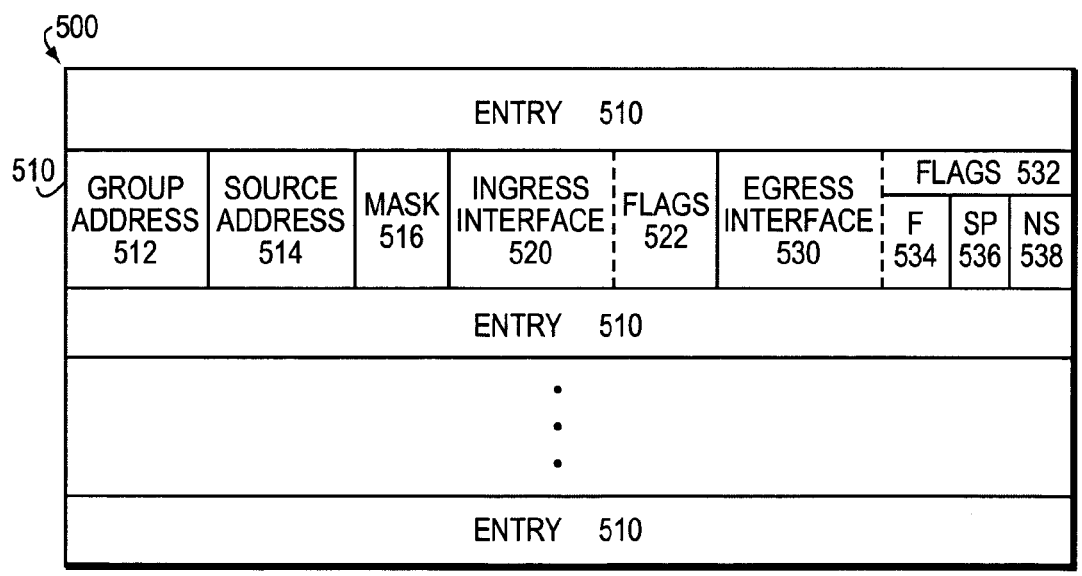
FIG. 5 is a schematic block diagram of an illustrative embodiment of a multicast forwarding information base (MFIB) multicast forwarding table that may be advantageously used with the present invention.

Detection of duplicate packets that could lead to formation of a multicast loop typically occurs in the control plane based on data-driven event signals from the data plane. A data-driven event is generally characterized by routing information stored in multicast forwarding entries of the MFIB forwarding table 500. FIG. 5 is a schematic block diagram of an illustrative embodiment of the MFIB multicast forwarding table 500 that may be advantageously used with the present invention. The MFIB forwarding table 500 comprises a plurality of entries 510, each of which is populated by a multicast routing protocol, such as PIM, with routing information (i.e., a route). Each entry 510 includes a group address field 512 containing a multicast group network (IP) address, a source address field 514 containing a source IP address and a mask field 516 containing a mask value indicating the number of most significant bits of the group (and source) address needed to form a prefix.

Each MFIB forwarding table entry 510 also includes an ingress interface field 520 that specifies an ingress interface on which an incoming multicast packet should be accepted, as well as an egress interface(s) field 530 containing a list of egress (forwarding) interfaces over which the incoming packet should be forwarded. One or more control flags 522, 532 may be associated with each interface of the entry, wherein the control flags specify certain actions/behavior to be taken by the router in response to the reception of the incoming packet. For example, a control flag F 534 indicates whether an accepted multicast packet matching the entry is to be forwarded over an associated interface, a control flag SP 536 is used to signal the route processor of the arrival of a multicast data packet and a control flag NS 538 is used to control the behavior of a forwarding engine (i.e., MFIB) in asserting the SP flag 536. Examples of control flags that may be advantageously used with the present invention are provided in U.S. patent application Ser. No. 10/376,006 titled Multicast-Routing-Protocol-Independent Realization of IP Multicast Forwarding, by I. Kouvelas et al, filed Feb. 28, 2003, which is hereby incorporated by reference as though fully set forth herein.

In response to receiving the incoming packet from a neighbor, the MFIB 480 performs a lookup into its forwarding table 500 to find a route of an entry 510 that matches a multicast destination address of the packet. The matching route instructs the router as to which egress interfaces the packet should be forwarded. For certain multicast routing protocols (such as PIM-SM and PIM-SSM), the multicast packet is typically accepted on a single ingress interface, i.e., the RPF interface that represents the shortest path to the source, and is forwarded out a set of egress interfaces to other destinations (routers) that have expressed interest in receiving the data traffic. The ingress interface 520 for the matching entry may have one or more asserted control flags 522 instructing the data plane 470 to signal the control plane 410 when the multicast packet is received at the router. The arrival of the multicast packet on that ingress interface is thus a data-driven event.

Data-driven events cause changes in state and control messages exchanged among a multicast routing protocol, such as PIM, executing on the router and its neighbors. In the illustrative multicast NSF router architecture, the data plane 470 notifies the control plane 410 of the data-driven event (via a control signal) and the control plane interprets that event in order to re-converge on the correct forwarding state. The MFIB 480 is the multicast component in the data plane that notifies MRIB 450 in the control plane of the data-driven event. MRIB then passes that notification to PIM 430, which uses the reception of multicast data packets that are to be forwarded by the router to infer portions of the current network topology used to forward the packets. The control signal received by PIM indicates that a data-driven event occurred for a particular source and group address 512, 514 of a multicast data packet that was received at a particular interface of the router. Reception of a multicast packet can thus be interpreted as an event signal to modify the contents of the MFIB forwarding table 500.

In the illustrative embodiment, if a packet is received on an egress interface that is used for forwarding out of the router, the data plane (e.g., MFIB) communicates the data-driven event to the control plane (e.g., PIM). Protocol negotiation between the router and other PIM-enabled routers on the link, including the neighbor that forwarded the packet, is then used to determine which router should be forwarding traffic over the interface and link. Such protocol negotiation occurs in the control plane, requiring "live" PIM components 430 on all the routers. Here, PIM employs conventional assert messages to determine which router should be forwarding the packet over the link and which router is in error. The PIM assert protocol negotiation procedure is well-known and described in the previously incorporated *Protocol Independent Multicast—Sparse Mode (PIM-SM): Protocol Specification (Revised)*, Internet Engineering Task Force Internet-Draft, draft-ietf-pim-sm-v2-new-09.txt. However since the data plane is disconnected from the control plane during NSF recovery, communication between the MFIB 480 and PIM 430 is disabled, causing the MFIB to blindly forwarded traffic and possibly generate duplicate packets or even form a multicast loop.

The present invention is directed to a technique for preventing multiple multicast forwarders from forwarding multicast packets for a route over a link (e.g., of a multicast distribution tree) in a computer network during NSF recovery of one or more failures in the control plane 410 of the multicast router 200. As noted, the functional infrastructure 400 of the router allows traffic forwarding operations to continue throughout the data plane 470 in the presence of a failure and/or software restart to a multicast component, e.g., PIM 430, executing in the control plane. Another multicast component, e.g., a multicast forwarding information base (MFIB) executing in the data plane, is configured to prevent multiple multicast forwarders due to routing changes in the network that arise due to continued use of the stale routes during NSF recovery.

The condition that triggers multiple multicast forwarder prevention is the packet arriving at the router on an egress interface of the matching route. The arrival of the multicast packet on that egress interface is a data-driven event that indicates a forwarding conflict between the matching route in the MFIB and a neighbor that also forwards packets to that interface, which may result in duplicate packets and/or multicast loops. Typically the data plane notifies the control plane of the data-driven event (via a control signal) and the control plane interprets that event in order to re-converge on the correct forwarding state. However, as noted, the control plane is disconnected from the data plane during NSF recovery and the contents of the MFIB multicast forwarding table are frozen. This forces the MFIB to forward data traffic through the router using the frozen contents of its forwarding table during NSF recovery.

According to the inventive technique, upon discovering that the incoming multicast packet is received on an egress (i.e., forwarding) interface of the router for its matching route, the MFIB 480 halts forwarding of multicast packets over that interface for the route. Multicast packet forwarding over the egress interface may be halted by removing that interface from the route entry of the MFIB forwarding table 500. Alternatively, multicast packet forwarding may be halted by removing the F flag 534 associated with the egress interface of the route entry 510. Specifically, the MFIB is configured to assume that (function as if) the NSF router 200 would lose the PIM assert protocol negotiation procedure with its neighbor (without performing an election) if the procedure were to take place. As a result, the MFIB illustratively removes this egress interface from its list of forwarding interfaces 530 for the route.

Note that MFIB does not remove the entire route from the forwarding table, just the forwarding state for the interface on the route. This allows the neighbor to temporarily represent a "live" branch on the multicast distribution tree. Forwarding on other egress interfaces for the route will continue uninterrupted. Moreover, receivers "down-stream" of the router will continue to receive packets from the other multicast forwarder (neighbor) until the PIM assert protocol negotiation procedure takes place. In essence, since the control plane has failed and is unable to immediately negotiate a correct forwarding with the neighbor, the MFIB unilaterally halts forwarding of the packet over the egress interface for that route to avoid the possible generation of duplicate packets and/or formation of a multicast loop.

After NSF and control plane recovery, PIM 430 and MRIB 450 send their complete forwarding information to MFIB 480 to update the stale routes in the forwarding table 500. Since PIM may not have seen the data event indicating the formation of a multicast loop, the complete updated route information will likely contain state that specifies that MFIB should be forwarding on that egress interface (even though that data event happened). When the MFIB resumes forwarding over that interface, the full PIM assert protocol negotiation message exchange is triggered (initiated) for the route among the PIM neighbors on the link to elect a router (multicast forwarder) that will forward the packet over the link, thereby resolving the forwarding conflict between the routers.

Figure 6:
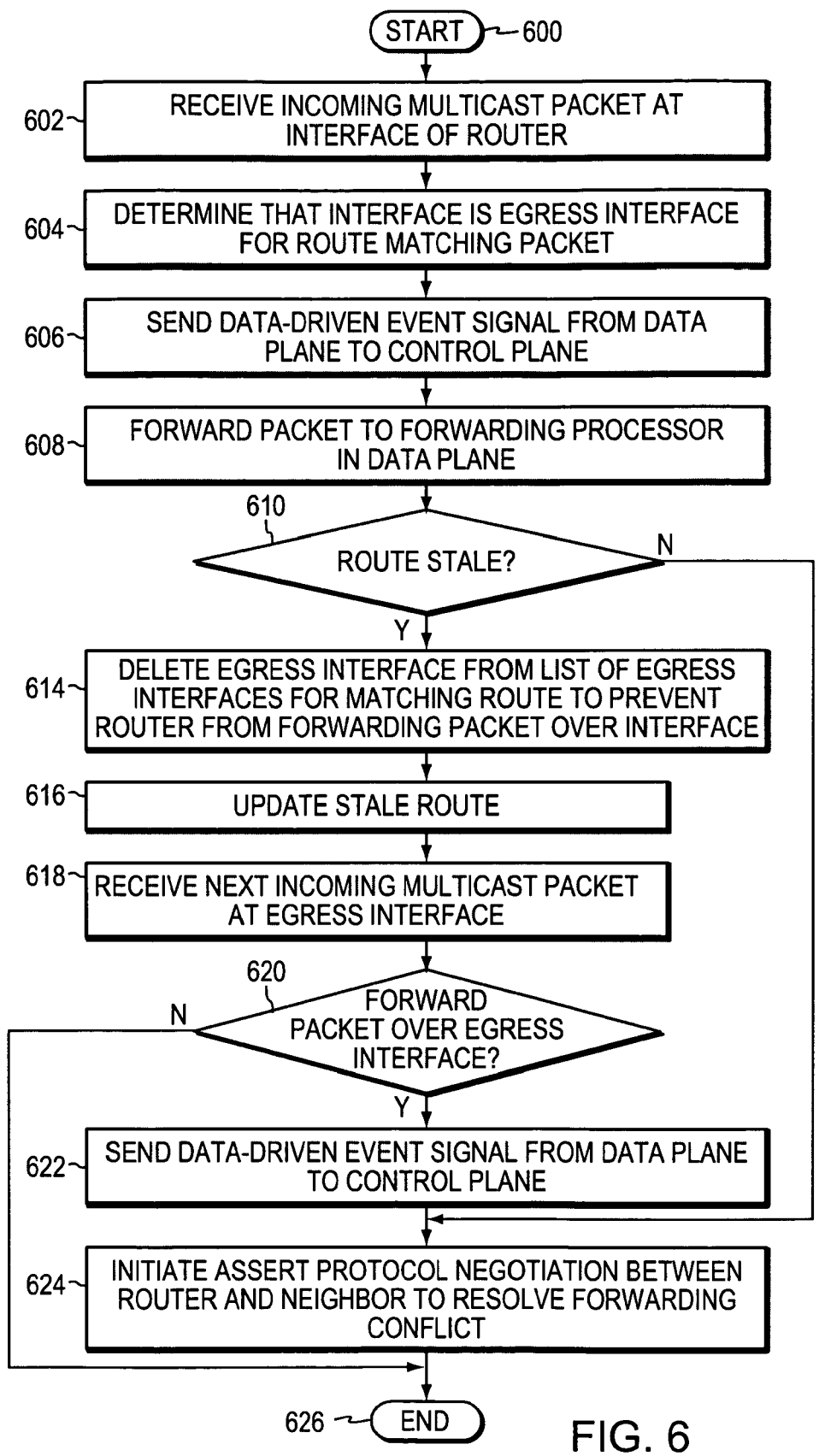
FIG. 6 is a flowchart illustrating a sequence of steps for implementing a multiple multicast forwarder prevention technique of the present invention.

FIG. 6 is a flowchart illustrating a sequence of steps for implementing the multiple multicast forwarder prevention technique of the present invention. The sequence starts at Step 600 and proceeds to Step 602 where an incoming multicast packet is received at a line card interface (in the data plane) of the router. MFIB performs a lookup into its forwarding table, matches an existing route of an entry to the packet and, in Step 604, determines that the packet was received on a line card interface that is used as an egress interface for that route. In response, MFIB generates and sends a data-driven event signal to the control plane (Step 606). Illustratively, the event signal is triggered by assertion of the F and NS flags 534, 538 on the egress interface over which the packet arrives.

In Step 608, the multicast packet is then forwarded ("punted") to the forwarding processor (FP Rx 280) in the data plane which, in Step 610, checks whether the route is stale (all routes were marked stale when NSF started). If the route is not stale (indicating that NSF recovery is not active and that the route has been updated), in Step 624, the control plane (e.g., PIM) initiates an assert protocol negotiation procedure between the router and neighbor that forwarded the packet to resolve the forwarding conflict, i.e., to determine which router should be forwarding traffic over the interface. The sequence then ends at Step 626. However, if the route is stale (thus indicating that NSF recovery is active and that the route has not been updated since a control plane failure), MFIB deletes the egress interface from the outgoing (egress) interface list for the route (Step 614), thereby preventing the router from forwarding any further packets over the interface and onto the link. Thus, the neighbor that forwarded the incoming packet to the link is the sole multicast router/forwarder forwarding packets to the link.

When NSF recovery subsequently ends, communication between the data plane and control plane is reestablished. In Step 616, the stale route in the MFIB forwarding table is updated with a "fresh" route from the recovered control plane (PIM) and the stale bit is removed from the route. In Step 618, a next incoming multicast packet is received at the egress interface and, in Step 620, a determination is made as to whether the updated route still indicates forwarding of the packet over that interface. If not, the sequence ends at Step 626; otherwise, MFIB generates and sends a data-driven event signal to the control plane (PIM) in Step 622. In response, PIM initiates the assert protocol negotiation procedure between the router and neighbor that forwarded the packet to resolve the forwarding conflict (Step 624). The sequence then ends at Step 626.

While there has been shown and described an embodiment of a technique for preventing multiple multicast forwarders from forwarding multicast packets for a route over a link during NSF recovery of one or more failures in a control plane of a multicast router, it is to be understood that various other adaptations and modifications may be made within the spirit and scope of the present invention. For example, it should be noted that the novel technique may apply to any multicast routing protocol that uses only a single ingress interface per route and that utilizes control plane forwarder election. Moreover, the inventive technique may apply to various implementations of NSF for PIM, such as NSF for PIM-SM and PIM source specific multicast (PIM-SSM).

The foregoing description has been directed to specific embodiments of this invention. It will be apparent, however, that other variations and modifications may be made to the described embodiments, with the attainment of some or all of their advantages. For instance, it is expressly contemplated that the teachings of this invention, including the various multicast components described herein, can be implemented as software, including a computer-readable medium having program instructions executing on a computer, hardware, firmware, or a combination thereof. In addition, it is understood that the data structures described herein can include additional information while remaining within the scope of the present invention. Accordingly this description is to be taken only by way of example and not to otherwise limit the scope of the invention. Therefore, it is the object of the appended claims to cover all such variations and modifications as come within the true spirit and scope of the invention.

What is claimed is:

1. A system comprising:
a multicast router having an infrastructure that allows non-stop forwarding (NSF) recovery, wherein data traffic forwarding operations continue throughout a data plane of the multicast router in the presence of a failure of a first multicast component in a control plane of the multicast router; and
a second multicast component of the data plane, the second multicast component configured to monitor incoming multicast packets received on an interface of the multicast router, compare the incoming multicast packets with entries of a multicast forwarding table of the data plane to find a route of an entry that matches the incoming multicast packets, wherein at least one entry of the multicast forwarding table indicates the interface is an egress interface for the route, detect multiple multicast forwarders by determining that an incoming multicast packet associated with the route was received on the egress interface for the route, and, in response, prevent multiple multicast forwarders from forwarding multicast packets for the route over a link coupled to the interface during a NSF recovery of a failure of the first multicast component.

2. The system of claim 1 wherein receipt of the incoming multicast packet associated with the route on the egress interface for the route indicates a forwarding conflict.

3. The system of claim 1 wherein the second multicast component is further configured to prevent multiple multicast forwarders from forwarding multicast packets for the route over the link by removing the interface from a route entry of the multicast forwarding table.

4. The system of claim 1 wherein the second multicast component is further configured to prevent multiple multicast forwarders from forwarding multicast packets for the route over the link by manipulating a flag of a route entry of the multicast forwarding table.

5. The system of claim 1 wherein the second multicast component is further configured to prevent multiple multicast forwarders from forwarding multicast packets for the route over the link by unilaterally halting forwarding over the interface for the route.

6. The system of claim 1 wherein the first multicast component is a protocol independent multicast (PIM) routing protocol module.

7. The system of claim 1 wherein the second multicast component is a multicast forwarding information base (MFIB) and the multicast forwarding table is a MFIB forwarding table.

8. A method comprising:
initiating a non-stop forwarding (NSF) recovery of a multicast router, wherein data traffic forwarding operations continue throughout a data plane of the multicast router in the presence of a failure in a control plane of the multicast router;

receiving incoming multicast packets on an interface of the multicast router during the NSF recovery;

comparing the incoming multicast packets with entries of a multicast forwarding table of the data plane of the multicast router to find a route of an entry that matches the incoming multicast packets and checking if the interface is an egress interface for the route; and in response to a determination that an incoming multicast packet associated with the route was received on the egress interface for the route, preventing multiple multicast forwarders from forwarding multicast packets for the route over a link coupled to the interface during the NSF recovery.

9. The method of claim 8 wherein receiving the incoming multicast packet associated with the route on the egress interface for the route indicates a forwarding conflict.

10. The method of claim 8 further comprising:

populating the multicast forwarding table with the entries, each entry specifying an ingress interface for accepting incoming multicast packets and a list of egress interfaces for forwarding incoming multicast packets.

11. The method of claim 8 wherein the preventing prevents multiple multicast forwarders by removing the interface from a route entry of the multicast forwarding table.

12. The method of claim 8 wherein the preventing prevents multiple multicast forwarders by manipulating a flag of a route entry of the multicast forwarding table.

13. The method of claim 8 wherein the preventing prevents multiple multicast forwarders by unilaterally halting forwarding over the interface for the route.

14. The method of claim 8 wherein the initiating is in response to detecting a failure of a first multicast component in the control plane of the multicast router.

15. The method of claim 14 wherein the first multicast component is a protocol independent multicast (PIM) routing protocol module.

16. The method of claim 8 wherein the preventing is implemented by a second multicast component of the data plane of the multicast router.

17. The method of claim 16 wherein the second multicast component is a multicast forwarding information base (MFIB).

18. An apparatus comprising:

means for initiating a non-stop forwarding (NSF) recovery of the apparatus, wherein data traffic forwarding operations continue throughout a data plane of the apparatus in the presence of a failure in a control plane of the apparatus;

means for receiving incoming multicast packets at an interface of the apparatus during the NSF recovery;

means for comparing the incoming multicast packets with entries of a multicast forwarding table of the data plane of the apparatus to find a route of an entry that matches the incoming multicast packets and checking if the interface is an egress interface for the route; and means for preventing multiple multicast forwarders from forwarding multicast packets for the route over a link coupled to the means for receiving during the NSF recovery, in response to an incoming multicast packet associated with the route being received on the egress interface for the route.

* * * * *